(12) United States Patent
Anubolu et al.

(10) Patent No.: US 7,277,910 B1
(45) Date of Patent: Oct. 2, 2007

(54) SYSTEM AND METHOD FOR BALANCING RINGS COUPLING ROUTING PLATFORMS

(75) Inventors: Surendra Anubolu, Fremont, CA (US); James P. Rivers, Saratoga, CA (US); Stewart Findlater, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 905 days.

(21) Appl. No.: 10/441,487

(22) Filed: May 20, 2003

(51) Int. Cl.
*G06F 15/16* (2006.01)
*H04L 12/42* (2006.01)
*H04L 12/403* (2006.01)

(52) U.S. Cl. ............... 709/200; 709/251; 370/452

(58) Field of Classification Search ............. 370/450, 370/452, 455, 456; 709/200, 251
See application file for complete search history.

(56) References Cited

U.S. PATENT DOCUMENTS

| | | | | |
|---|---|---|---|---|
| 5,280,582 A | * | 1/1994 | Yang et al. | 709/225 |
| 5,331,636 A | * | 7/1994 | Yang et al. | 370/403 |
| 5,377,190 A | * | 12/1994 | Yang et al. | 370/456 |
| 5,477,540 A | * | 12/1995 | Yang et al. | 370/456 |
| 5,481,538 A | * | 1/1996 | Yang et al. | 370/456 |
| 5,537,413 A | * | 7/1996 | Yang et al. | 370/456 |
| 5,568,613 A | * | 10/1996 | Futral | 709/249 |
| 5,638,515 A | * | 6/1997 | Futral | 370/402 |

* cited by examiner

*Primary Examiner*—John B. Walsh
(74) *Attorney, Agent, or Firm*—Charles E. Krueger

(57) ABSTRACT

A ring access system, for use in system having a plurality of routing platforms coupled by redundant rings, that allows access to either ring when a token is received at a first ring if all outstanding locally-sourced data has been stripped from the second ring.

9 Claims, 3 Drawing Sheets

SYSTEM AND METHOD FOR BALANCING RINGS COUPLING ROUTING PLATFORMS

BACKGROUND OF THE INVENTION

Requirements for fault tolerance and high performance are becoming more common. Counter rotating ring topology connecting a series of switches or port ASICs provides an elegant method for achieving fault tolerance. It is highly desirable to use both rings for data transmission. This can potentially double the bandwidth or reduce the cost by half for a given bandwidth.

However, problems, such as assuring data is received at a target port ASIC in the order it is transmitted and balancing the load on both rings, arise when both rings are used to exchange data.

One way to solve these problems is to use one of the rings for the packet data transmission and the other for control information as in FDDI-2. However, this does not fully utilize the bandwidth of both the rings.

Alternatively, as in an Ether Channel implementation, a hash based on the contents of the packet may be used to select the ring the packet will be transmitted on. This will probabilistically distribute the traffic. This method will also require an additional set of queues for the counter rotating ring.

It is also possible to use one token that will control access to both the rings. This has potential ordering problems and it also requires the sender to have enough bandwidth to source data on both rings at the same time.

BRIEF SUMMARY OF THE INVENTION

In a first embodiment of the invention, a method utilizing both rings to transmit data and balancing data on the rings permits data to be transmitted on one ring if all outstanding locally-sourced data on the other ring has been stripped.

In another embodiment of the invention, each ring is coupled to a ring access controller (RAC). When a RAC is transmitting data on a ring it strips the data from the ring when data transmitted by the RAC is received by the RAC. The RAC indicates when all its outstanding transmitted data has been stripped from the ring.

In another embodiment of the invention, the assertion of an all outstanding frames stripped indication is delayed to account for possible delay of data in input buffers.

Other features and advantages will be apparent in view of the following detailed description and appended drawings.

DETAILED DESCRIPTION OF THE INVENTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

The invention will also be described with reference to various embodiments implemented in a routing platform. In the following, the term routing platform is utilized broadly to include any component such a router, bridge, switch, layer 2 or layer 3 switch, gateway, etc., that refers to components utilized to implement connectivity within a network or between networks.

Figure 1:
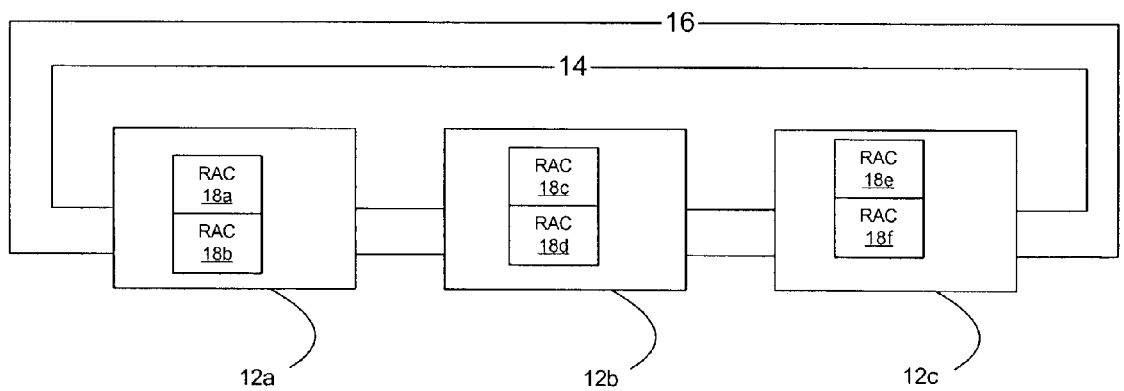
FIG. 1 is a block diagram of a stack including three port ASICs coupled by counter-rotating rings.

A first embodiment will be described with reference to FIG. 1 and utilizes routing platforms in the form of port ASICs. In FIG. 1, first, second, and third port ASICs 12a, 12b, and 12c are connected by first and second counter-rotating rings 14 and 16. Each port ASIC includes first and second ring access controllers (RACs) 18a and b, each for controlling access to a respective ring. In this embodiment, access to a ring is controlled utilizing a token passing method. A token, which is a special ring frame, is transmitted around a ring and only the RAC having possession of the token is permitted to transmit data on the ring.

Each RAC 18a-f stores a local ID that uniquely identifies the RAC. Ring frames transmitted by a RAC on a port ASIC include source IDs with the source ID being the ID of the RAC that transmits the ring. When the RAC on one of the port ASICs having a first source ID is transmitting ring frames it checks the source ID on all received frames and strips frames having the first ID from the ring.

Figure 2:
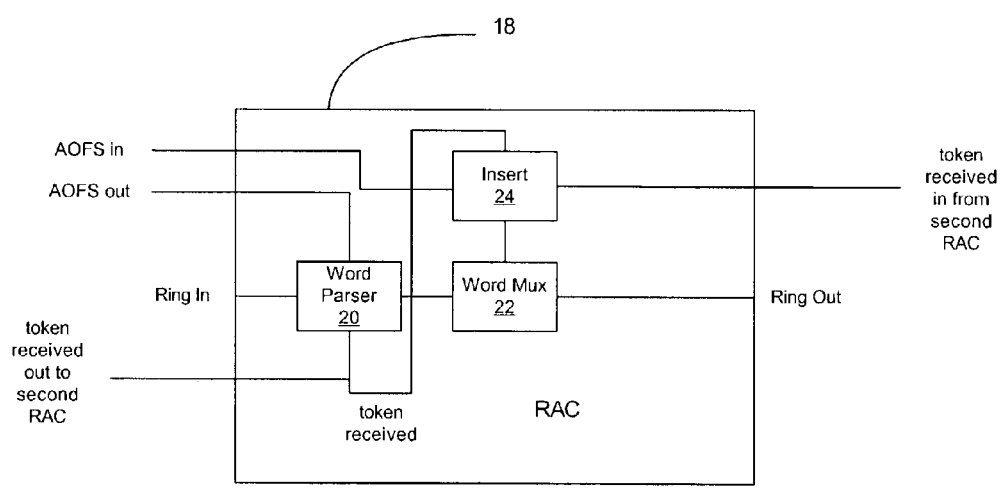
FIG. 2 is a block diagram of a ring access controller (RAC)

FIG. 2 is a block diagram of a first RAC 18a. An input line is connected to the Ring In side where data is received and an output line is connected to the Ring Out side where data is transmitted. The Ring In side is connected to the Ring Out side by Word Parser process 20 and Word Mux 22. The Word Parser generates a token received indication which is provided to a Token Received output. The Word Parser process includes an All-Outstanding-Frames-Stripped (AOFS) output to provide the AOFS signal to the input of the Insert process of the second RAC 18b on the port ASIC. An Insert process 24 is connected to the Word Mux 22 and includes a first input to receive the token received indication from the Word Parser process of the first RAC 18a, a second input to receive the AOFS signal from the Word Parser process of the second RAC 18b, and a third input to received the token received indication from the second RAC 18b.

Only those functions of the RAC 18 relevant to the current embodiment will be described. The Word Parser process 20 generates a Token Indication when a token is received at the RAC.

As described above, each ring frame includes a Source ID indicating the identity of the RAC which transmitted the ring frame. When the Word Parser process detects a Source ID equal to its own Source ID it determines that the received frame has been locally sourced and the frame is stripped.

Thus, in this embodiment the Word Parser process performs the functions of indicating when a token is received and stripping locally-sourced frames. Alternatively, these functions could be performed by separate processes.

The Insert process inserts frames held in the local receive buffer onto the ring while it holds the token. All received ring frames are discarded by the insert process. The Word Mux controls whether Ring in data or Inserted data is passed to the Ring Out side of the RAC.

Figure 3:
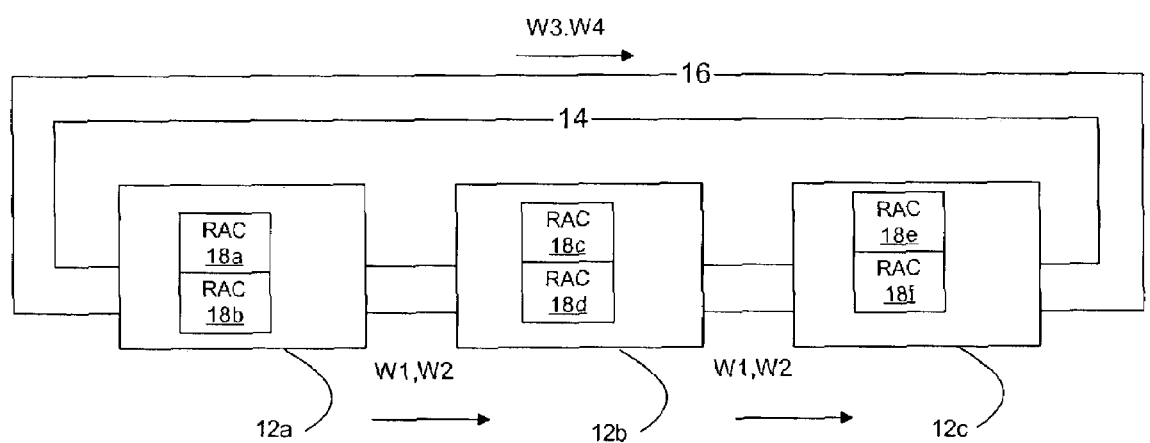
FIG. 3 is a block diagram depicting words transmitted on both rings by a single port ASIC.

As described above, to fully utilize the bandwidth of both rings two problems must be solved. First, it must be assured that data transmitted from transmitting port ASIC to a target port ASIC arrives in order. The out of order problem can be understood through an example depicted in FIG. 3. Assume that the first port ASIC 12a has four ring frames (W1, W2, W3, W4) to transmit to a third port ASIC 12c. If the first and second rings are counter-rotating then if W1 and W2 are transmitted on the first ring 14 then W1 and W2 are transmitted from the first port ASIC 12 to the third port ASIC 12c through the second port ASIC 12b. On the other hand, if W3 and W4 are transmitted on the second ring 16 then W3 and W4 are transmitted directly from the first port ASIC 12a to the third port ASIC 12c.

Accordingly, if frames W1 and W2 experience any delay transiting through the first RAC 18a of the second port ASIC 12b then W3 might be received before W1 and thus be received out of order.

Secondly, the loads on the ring must be balanced so that the bandwidth of both rings is efficiently utilized. In the presently described embodiment, the amount of time allotted to RAC for transmission of data is related to the elapsed time since the RAC last received the token. If other RACs have been transmitting on the ring the token tends to move slowly and the time for each RAC to transmit increases. Thus, there can be significant delays between receiving the token.

Figure 4:
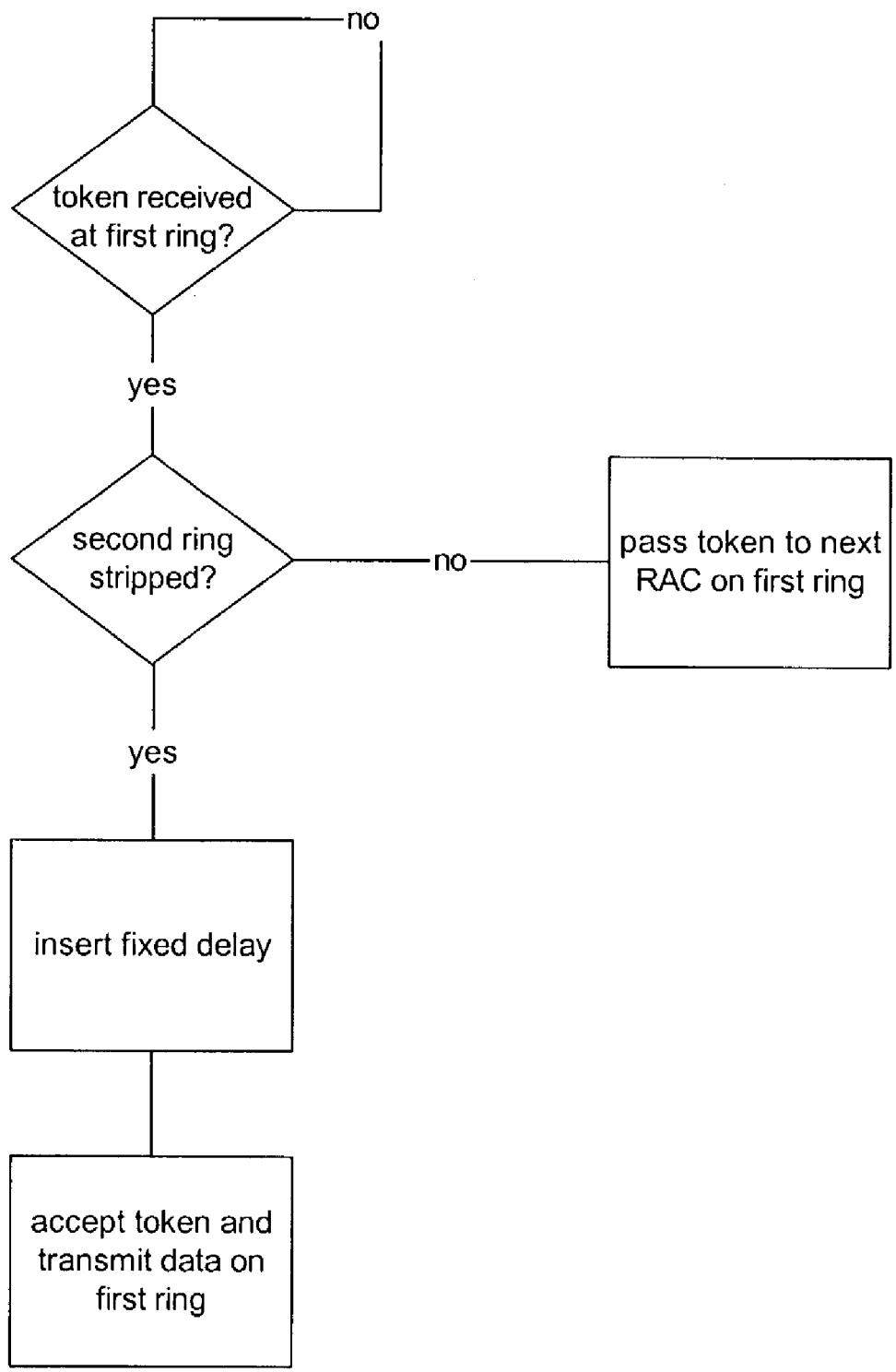
FIG. 4 is a flow chart depicting an embodiment of the invention.

The present embodiment, as depicted in the flow chart of FIG. 4, a token will accepted on a first ring if outstanding locally-sourced data has been stripped from the second ring. Accordingly, when a token is received on the first ring it must be determined whether all frames have been stripped from the second ring before the token is accepted on the first ring.

In order to determine whether outstanding data sourced on the second has been stripped, the locally transmitted frames sourced on the second ring are counted up and the locally stripped frames are counted down. This can be done in various ways. For example, a counter could be incremented when a locally sourced ring frame is transmitted and decremented when a locally sourced ring frame is received. A counter value of zero indicates all locally sourced ring frames have been stripped and the AOFS signal is asserted. Alternatively, a token received on the second ring indicates that all outstanding locally-sourced frames have been stripped from the second ring.

Also, in this embodiment, there is a delay after the last locally-sourced frame has been stripped before the AOFS indication generated by the Word Parser. This delay allows for any delay in processing one of the ring frames in the transmit buffer of the third port ASIC.

The Insert process determines whether to transmit when a token is received on a ring. Thus, the Insert process on each RAC must receive the All Outstanding-Frames-Stripped indication from the other RAC on the port ASIC to determine whether to respond to the receipt of the token. If a token is received at a first ring and the AOFS signal for the second ring has been asserted then the token is accepted.

The Insert and Word parser processes may be implemented as program code, stored on a computer readable medium, that is executed by a digital controller included in the RAC. The computer readable medium may include, among other things, magnetic media, optical media, electromagnetic fields encoding digital information, and so on. Alternatively, as is know in the art, the above-described processes may be implemented as hard-wired logic or a combination of executable program code and hard-wired logic.

The load balancing problem on the rings is also solved by the above described embodiment. As described above, for each ring only one RAC transmits at a time, i.e., the RAC that has the token. If the first ring is heavily loaded, i.e., a first port ASIC is transmitting a large amount of data then the token for the first ring will be held up at the first RAC on the first port ASIC. However, if the token for the second ring arrives at the first port ASIC it will not be accepted because locally sourced data is being transmitted on the first ring (the first ring has not been stripped). Thus, the token on the second ring will be passed to other port ASICs on the ring until it reaches a port ASIC that needs to transmit data. Thus, a feedback loop is established that balances loads on the rings. Accordingly the ring access adapts well to the dynamic ring congestion, as the absence of a token indicates the congestion and the port ASIC will use the ring that it sees the token on.

Accordingly, a ring access technique requiring minimal hardware has been described. The technique is transparent to the software and does not need dynamic updates to keep the ring balanced.

The invention has now been described with reference to the preferred embodiments. Alternatives and substitutions will now be apparent to persons of skill in the art. For example, in the above-described embodiment counter-rotating rings are described. However, the invention can also be implemented advantageously in a system with both rings transmitting in the same direction. Alternate techniques may be utilized to determine when all outstanding locally-sourced frames have been stripped. Accordingly, it is not intended to limit the invention except as provided by the appended claims.

What is claimed is:

1. A method, for use in a system having a plurality of routing platforms coupled by first and second rings, for controlling access to the first and second rings when data is ready to be transmitted from a particular routing platform, with routing platforms coupled to each ring passing a token and with only the routing platform having possession of the token being permitted to transmit data on the ring, said method, performed at a first routing platform having possession of the token for the first ring, comprising the steps of:
   determining whether all outstanding data sourced by the first routing platform that has been transmitted on the second ring has been stripped from the second ring; and
   transmitting data on the first ring only if all outstanding data sourced by the first routing platform on the second ring has been stripped.

2. The method of claim 1 further comprising the step of:
   removing all frames from the second ring that were transmitted by the current routing platform to strip locally sourced frames from the second ring.

3. The method of claim 2 where said step of removing further comprises the steps of:
   inserting a first source ID, identifying the current routing platform, into each frame transmitted onto the second ring; and
   removing each frame received on the second ring that includes the first source ID to strip the locally sourced frames from the second ring.

4. The method of claim 3 where said step of determining further comprises the steps of:
  counting the total number of frames transmitted by the current routing platform onto the second ring;
  counting the number of frames stripped from the second ring; and
  indicating when the number of frames stripped is equal to the total number of frames transmitted.

5. A system, for use in an environment having a plurality of routing platforms coupled by first and second rings, for controlling access to the first and second rings when data is ready to be transmitted from a first routing platform in the plurality, said system comprising:
  a first ring access controller (RAC) having a ring input adapted to receive ring frames from the first ring and a ring output adapted to transmit ring frames on the first ring, with the first RAC storing a first ID uniquely identifying the first RAC, and with each ring frame including a source ID field holding an ID of the RAC that transmitted the ring;
  a second ring access controller (RAC) having a ring input adapted to receive ring frames from the second ring and a ring output adapted to transmit ring frames on the second ring, with the second RAC storing a second ID uniquely identifying the second RAC;
  with the first RAC comprising:
  a word stripping block, coupled to the ring input, configured to strip a received ring frame from the first ring if the source ID in the received ring frame is equal to the first ID and configured to assert an All-Outstanding-Frames-Stripped indication when all outstanding frames on the ring sourced by the first RAC have been stripped;
  a token detection block configured to assert a token received indication when the token is received at the first RAC;
  with the second RAC comprising:
  a word stripping block, coupled to the ring input, configured to strip a received ring frame from the second ring if the source ID in the received ring frame is equal to the second ID and configured to assert an All-Outstanding-Frames-Stripped indication when all outstanding frames on the ring sourced by the second RAC have been stripped;
  a token detection block configured to assert a token received indication when the token is received at the second RAC;
  an insert block, coupled to receive a token received indication from the word parser block of the second RAC and to receive All-Outstanding-Frames-Stripped and token received indications from the word parser block on the first RAC, with the insert block configured to insert ring words to be transmitted from the first routing platform onto the second ring only if the token received indication is asserted by the word parser block on the second RAC and the token received indication or All-Outstanding-Words-Stripped indication is asserted by the word parser block on the first RAC.

6. A system, for use in an environment having a plurality of routing platforms coupled by first and second rings, for controlling access to the first and second rings when data is ready to be transmitted from a particular routing platform, with routing platforms coupled to each ring passing a token and with only the routing platform having possession of the token being permitted to transmit data on the ring, said system, included in a first routing platform having possession of the first token for the first ring, comprising:
  means for determining whether all data sourced by the first routing platform that has been transmitted on the second ring has been stripped from the second ring; and
  means for transmitting data on the first ring only if all outstanding data sourced by the first routing platform on the second ring has been stripped.

7. The system of claim 6 further comprising:
  means for stripping all frames from the second ring that were transmitted by the current routing platform to strip locally sourced frames from the second ring.

8. The system of claim 6 where said means for determining further comprises:
  means for counting the total number of frames transmitted by the current routing platform onto the second ring;
  means for counting the number of frames stripped from the second ring; and
  means for indicating when the number of frames stripped is equal to the total number of frames transmitted.

9. A system, for use in an environment having a plurality of routing platforms coupled by first and second rings, for controlling access to the first and second rings when data is ready to be transmitted from a first routing platform in the plurality, said system comprising:
  a first ring access controller (RAC) having a ring input adapted to receive ring frames from the first ring and a ring output adapted to transmit ring frames on the first ring, with the first RAC storing a first ID uniquely identifying the first RAC, and with each ring frame including a source ID field holding an ID of the RAC that transmitted the ring, with the first RAC adapted to accept a token to transmit frames only if all frames have been stripped from the second ring; and
  a second ring access controller (RAC) having a ring input adapted to receive ring frames from the second ring and a ring output adapted to transmit ring frames on the second ring, with the second RAC storing a second ID uniquely identifying the second RAC, with the second RAC coupled to indicate to the first RAC when all outstanding frames transmitted by the second RAC onto the second frame have been stripped.

* * * * *